United States Patent [19]

Purfurst

[11] Patent Number: 4,671,322

[45] Date of Patent: Jun. 9, 1987

[54] SEQUENTIAL FORMATION TESTER HAVING THREE WAY NORMALLY CLOSED VALVE

[75] Inventor: Ernest H. Purfurst, Houston, Tex.

[73] Assignee: Halliburton Company, Duncan, Okla.

[21] Appl. No.: 767,382

[22] Filed: Aug. 19, 1985

[51] Int. Cl.[4] .......................................... F16K 11/048
[52] U.S. Cl. ........................ 137/625.27; 137/625.65; 137/625.48; 251/334; 251/359
[58] Field of Search .................. 137/625.48, 625.49, 137/625.5; 251/357, 900, 359, 368, 333, 334, 625.27, 625.26, 625.25, 625.65, 368

[56] References Cited

U.S. PATENT DOCUMENTS

| | | | |
|---|---|---|---|
| 874,652 | 12/1907 | Bailey | 251/357 |
| 2,250,813 | 8/1941 | Rea | 251/359 X |
| 2,984,450 | 5/1961 | Doe | 251/175 |
| 3,126,915 | 3/1964 | Hunt | 137/625.27 X |
| 3,598,145 | 8/1971 | Wolfson | 251/368 X |
| 3,605,804 | 9/1971 | Way | 137/625.27 X |
| 4,408,629 | 11/1983 | Lafont | 251/368 X |

FOREIGN PATENT DOCUMENTS

| | | | |
|---|---|---|---|
| 607032 | 8/1948 | United Kingdom | 137/625.27 |
| 2038451 | 7/1980 | United Kingdom | 251/334 |
| 2109900 | 6/1983 | United Kingdom | 251/333 |

*Primary Examiner*—A. Michael Chambers
*Assistant Examiner*—John C. Fox
*Attorney, Agent, or Firm*—W. J. Beard

[57] ABSTRACT

In a formation testing apparatus lowered into a well to conduct various tests, an internal hydraulic powered system operates various components. In the present disclosure, an improved valve having metal seats overlayed with an elastomeric material cooperates with valve elements to thereby enhance low power for valve operations. The valve element and mating valve seat cooperate on valve opening or closing to reduce valve power requirements and the forces needed for operation.

5 Claims, 3 Drawing Figures

SEQUENTIAL FORMATION TESTER HAVING THREE WAY NORMALLY CLOSED VALVE

BACKGROUND OF THE DISCLOSURE

This disclosure is directed to a formation tester, and more particularly to a sequential formation tester. As set forth in recent U.S. Pat. No. 4,513,612 issued to the common assignee of the present disclosure, a formation tester is described which incorporates a tool hydraulic system within the body of the formation tester for operation of the tester. The formation tester hydraulic circuit or system incorporates a number of valves important to operation of the formation tester. The formation tester is normally used in adverse environmental circumstances, namely relatively high ambient temperatures and elevated pressures in downhole locations. Moreover, all of the apparatus within the formation tester is exposed to the elevated temperature and is heated by that environment. Ambient bottomhole temperatures significantly impact component operation.

Power for operation of the tool is normally furnished from a power supply conductor in the well logging cable. The well logging cable supports the formation tester at a selected depth in a well borehole for testing, a cable providing electrical power on a set of conductors in the cable. The cable normally is wrapped with a protective sleeve to also enclose signal conductors in the cable. The power demands of the apparatus vary but can be quite high. Peak power demands are often excessive in light of the length of the cable. There typically will be some voltage drop in providing the power necessary to operate the equipment. Moreover, peak power demands typically arise during manipulation of the components of the formation tester. For instance, a snorkel must be extended or retracted. This typically is accomplished by operation of the hydraulic system, such operations requiring power for operation of the various valves in the hydraulic system. These valves are shown in the hydraulic circuit set forth in U.S. Pat. No. 4,513,612. Several different types of valves are required; one of the several valves is a normally closed three way valve. The valve must have power to operate in spite of elevated ambient temperature.

The present apparatus is an improved normally closed four way valve to be used in a formation tester. It is improved by the incorporation of soft seats to enable the valve to seat more readily with a reduced power demand. Recalling that power available in the tool is somewhat limited, peak power demands are reduced by the structure of the present valve.

In many circumstances, it is desirable to incorporate hard valve seats perfecting a seal in conjunction with movable valve elements. However, they must be machined to a quality match to assure proper valve closure. That is, the valve element must seat perfectly on the valve seat to obtain closure. When the valve element and seat are both made of hard materials, certain benefits can be obtained but they are at a cost, namely an increased force required to sustain the valve element closure against the seat.

By contrast, this structure sets forth a normally closed four way valve for use in a formation tester having a soft seat construction. This reduces the peak power demand necessary for valve operation. This enables the formation tester to avoid risk of partial closure, thereby requiring reduced power demand during opening or closing, and also assuring more positive opening and closing of the valve element relative to the valve seat. This particularly is helpful by enabling incorporation of a smaller solenoid, either smaller with reduced number of turns or smaller with a reduced wire size. Moreover, this reduces the current peak required for operation of the solenoid coil moving the valve to the open or closed position. The present valve is designed so that there are pressure dependent forces created in the valve which aid in valve element movement. That is, valve operation is assisted by forces dependent on the hydraulic fluid acting in the valve. This reduces the power required by the solenoid. This assists in closure. Moreover, the soft seat arrangement not only reduces the force required to sustain the closure, it also assists in defining enlarged areas which proportionately convert fluid into valve element operating forces.

One advantage of the present apparatus is the incorporation of a four way normally closed valve for use in a sequential formation tester, the valve incorporating seats which have relatively soft material contacted with the valve element material to enable closure with reduced loading. This valve operates at downhole elevated temperature. Even though the temperature might rise significantly, the valve element and cooperative seat still operate in the same manner and are able to achieve closure without leakage with the incorporation of the soft seat arrangement set forth herein. Other advantages will be more readily apparent upon a consideration of the below included written specification in conjunction with the drawings which follow.

DESCRIPTION OF THE DRAWINGS

So that the manner in which the above recited features, advantages and objects of the invention, as well as others, which will become apparent, are attained and can be understood in detail, a more particular description of the invention, briefly summarized above, may be had by reference to the embodiments thereof illustrated in the appended drawings, which drawings form a part of this specification.

It is to be noted, however, that the appended drawings illustrate only typical embodiments of the invention and are not to be considered limiting of its scope, for the invention may admit to other equally effective embodiments.

FIG. 3 is a partial view similar to FIG. 2 contrasting operative positions of the valve dependent on solenoid valve operation;

DETAILED DESCRIPTION OF THE PREFERRED EMBODIMENT

Figure 1:
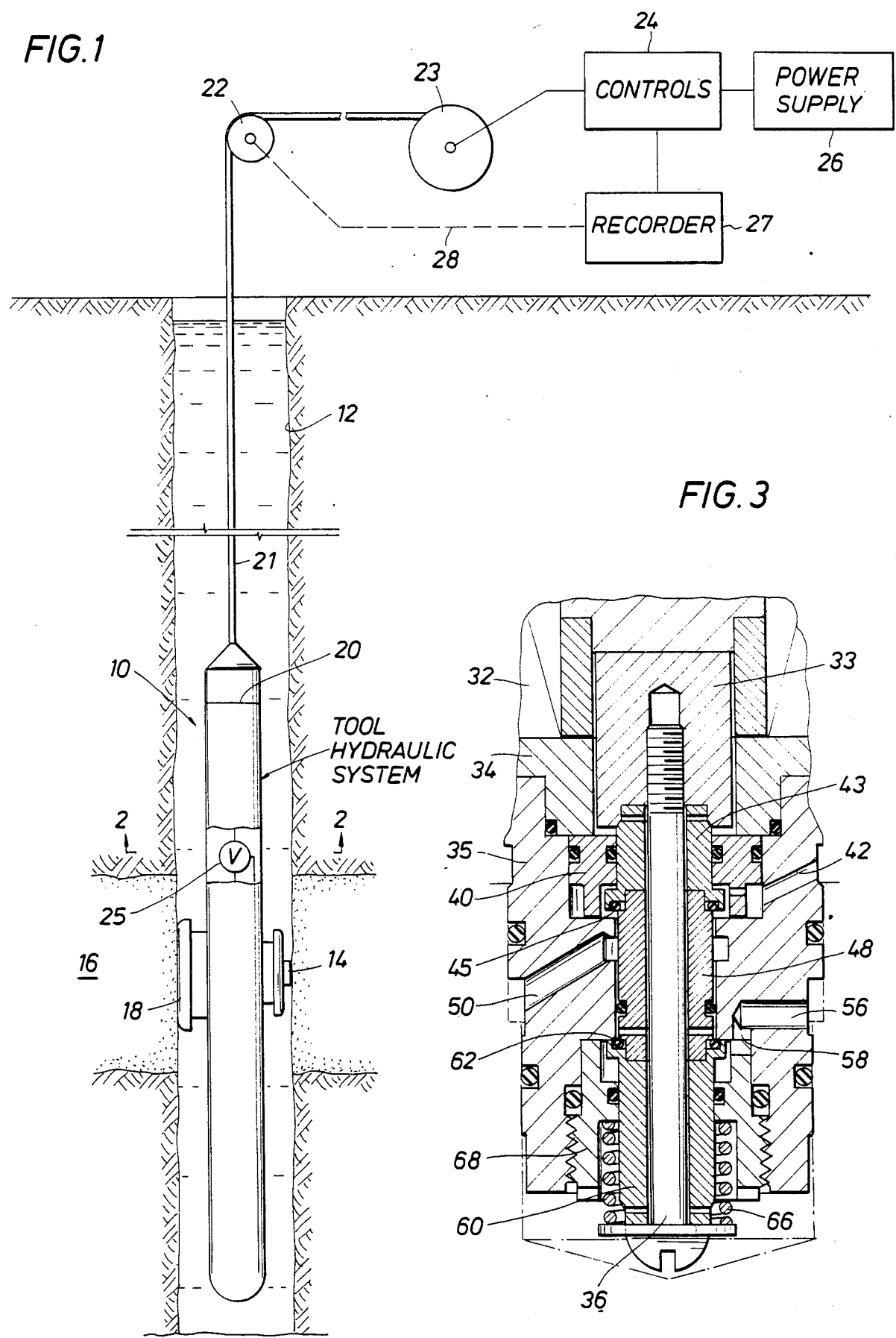
FIG. 1 shows a sequential formation tester suspended on an armored logging cable in a well borehole for conducting formation testing, the formation tester incorporating a tool hydraulic system.

Attention is first directed to FIG. 1 of the drawings which discloses a sequential formation tester 10 suspended in a well bore 12. The formation tester incorporates a protruding snorkel 14 which extends on one side of the tool body to penetrate an adjacent formation 16. The formation tester 10 is held in a specific location by a protruding backup shoe 18. Operation of the snorkel 14 and the backup shoe 18 is controlled by the tool hydraulic system 20. The tool hydraulic system 20 incorporates the four way normally closed valve of this disclosure which is identified by the numeral 25. More will be noted concerning its operation with a detailed description of the structure shown in FIG. 2.

The sequential formation tester 10 is supported on an armored logging cable 21 which passes over a sheave 22 located at the wellhead, the armored logging cable being stored on a drum or reel 23. It is spooled from the drum to pass over the sheave and thereby extend several thousand feet along the well borehole 12 to a selected depth. The logging cable 21 encloses a number of conductors which connect with equipment at the surface including suitable power supplies 26 and a control circuit identified by the number 24. The signals obtained from the tester 10 are provided to a recorder 27. The recorder records signals obtained from downhole operation as a function of depth of the tester 10 in the well; the depth is obtained by an electronic or mechanical depth measuring means identified at 28.

One exemplary sequence of operation is set forth in U.S. Pat. No. 4,513,612, assigned to the present assignee of this disclosure. That disclosure sets forth in greater detail operation of the hydraulic system in the sequential formation tester 10. Moreover, one sequence of operations is set forth involving manipulation of the hydraulic system necessitating the use of valves in the hydraulic system. This disclosure provides improved operation through four way normally closed valve 25 shown in FIG. 1 and better illustrated in detail in FIG. 2.

Figure 2:
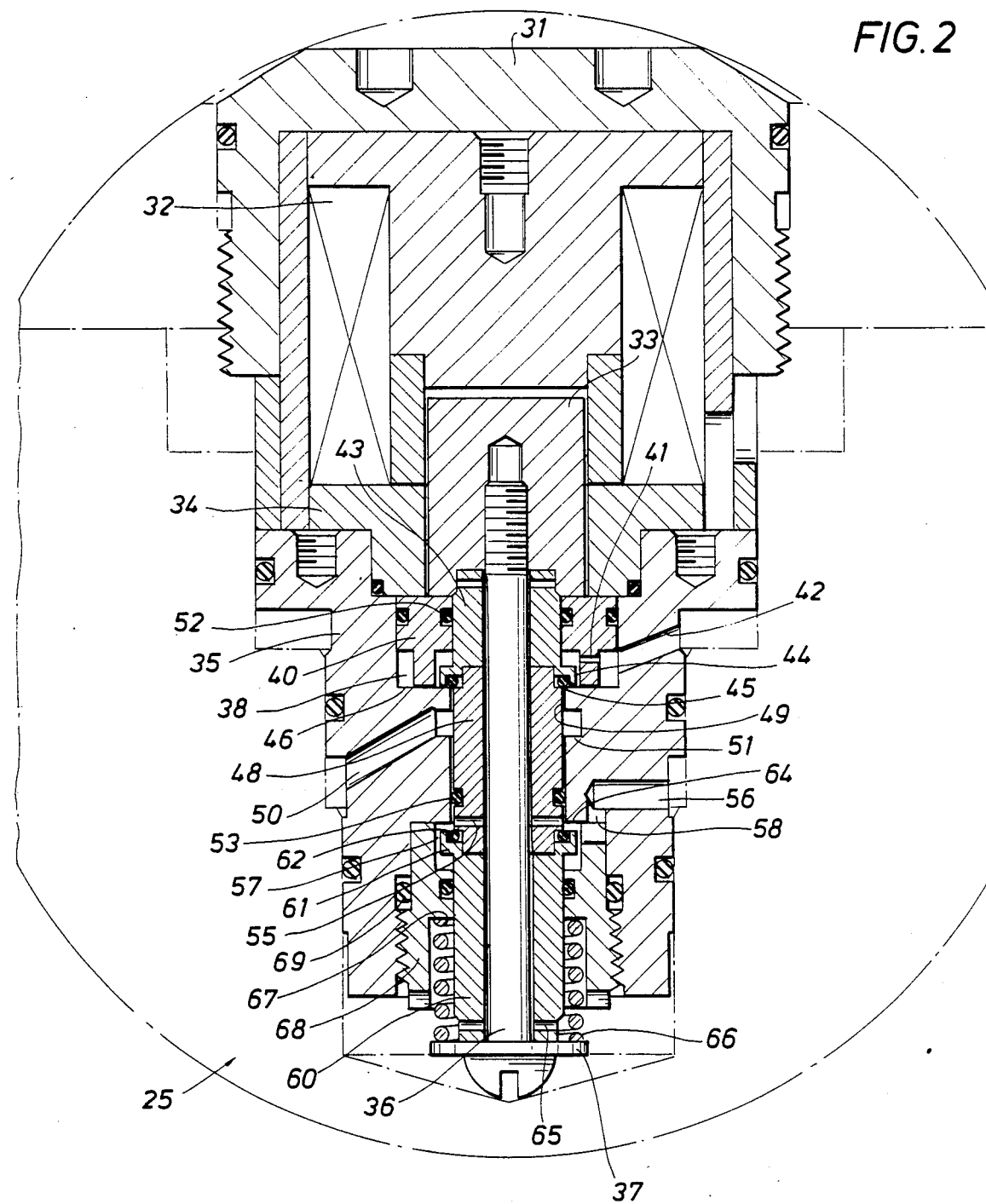
FIG. 2 is a sectional view along the line 2—2 of FIG. 1 showing details of construction of a three way normally closed valve in the tool hydraulic system.

The valve 25 in FIG. 2 is mounted in the body of the elongate cylindrical structure which comprises the sequential formation tester 10. As shown in FIG. 2, the valve 25 incorporates a cover 31 which has an upstanding cylindrical portion for supporting a solenoid coil winding 32. The coil is held in position by a plate 34. The plate 34 joins to a valve body 35 which aligns axially with the coil 32. An end located pole 33 threads to a stem 36 which is pulled upwardly when the coil is energized. The stem 36 has a lower head which supports a thrust washer 37. The components supported on the thrust washer 37 will be described in detail hereinafter.

The valve body 35 is centrally bored to define an internal cavity 38. A ring 40 is positioned in the cavity. The ring has internal and external seals to prevent leakage upwardly as viewed in FIG. 2. Moreover, the ring 40 has a protruding shoulder which is perforated at 41 with one or more passages to communicate through the passages. An inlet port 42 delivers hydraulic fluid which passes through the several passages 41 to deliver fluid in the vicinity of a valve element and valve seat as will be described.

Hydraulic fluid under pressure passes through the openings 41. When the valving action occurs, fluid is introduced interiorally of the ring 41. A hollow cylindrical spool 43 is positioned around the stem 36. As shown both in FIG. 2 and the sectional view of FIG. 4 the spool 43 has an overhanging, downwardly facing lip 44 defining a normally closed valve element. This valve element has an internal downwardly facing groove which captures an O-ring 45. The O-ring in conjunction with the capture groove on the interior of the lip 44 seals the valve element. A facing shoulder 46 terminates the bored portion of the valve body 35 and defines a valve seat face cooperative with the valve element thereabove. In the position of FIG. 2, the valve is closed whereby sealing is accomplished against the face 46. The face 46 is preferably coated with an elastomeric material such as a fluoropolymer. A suitable polymer material is Teflon, a trademark of Du Pont Company. It is placed on the surface to a thickness of up to about 0.0005 inches. The thickness of the yieldable material is exaggerated for emphasis in FIG. 4. When the O-ring 45 is pressed against the surface, it is captured to perfect sealing of the valve element which includes the downwardly protruding lip at 44.

An intermediate spool 48 is below the upper spool 43; the two spools nest together so that the seal ring 45 is captured by the peripheral edge of the spool 48. FIG. 3 again shows how the spools 43 and 48 cooperate to secure the O-ring 45 for movement between open and closed positions. In the closed position of FIG. 2, there is no fluid flow. Fluid does flow past the cooperative valve element and valve seat construction when the solenoid 32 is operated.

The numeral 49 identifies an enlarged passage downwardly from the valve seat for fluid flow. This passage terminates at a circular groove 51 which communicates with an outlet port 50 for the valved fluid flow. In summary, when the valve is closed as shown in FIG. 2, there is no flow from the inlet port 42 through the outlet port 50. When the valve is opened, there is flow from the inlet port 42 through the outlet port 50. As described to this juncture, the flow path is thus through the inlet port 42, then through the several passages 41 to the near vicinity of the valve element and seat, past the valve seat when the valve is in the open position shown in FIG. 3, then downwardly along the spool 48, and to the outlet port 50. The O-ring 52 prevents upward flow beyond the region where the valving action occurs while the O-ring 53 prevents downward flow out of that region. Thus, these O-rings isolate fluid flow so that the valve action regulates this fluid flow without fluid escaping to other portions of the equipment.

Figure 4:
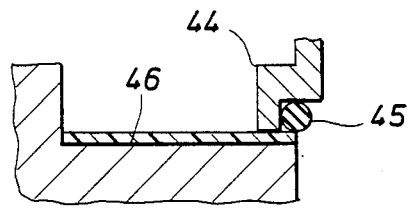
FIG. 4 is a partial sectional view of a valve seat with resilient material thereon.

The spool 48 is drilled with several radial passages at 55 located below the O-ring 53. These passages collectively are part of a fluid flow path from a cylinder port 56. The cylinder port 56 admits fluid into a surrounding ring-like cavity 57. The fluid thus flows through the cylinder port 56, downwardly through the vertical passage 58 and enters into the cavity 57. Fluid received in this region is immediately adjacent of another valve as will be described. The spool 48 nests against a spool 60. The spool 60 supports an outwardly protruding flange having an upstanding lip, this defining a seal securing lip 61 in the fashion of the lip 44 previously described. It holds an O-ring 62 in a captured position, thereby enabling sealing action to be accomplished. The O-ring 62 is shown in FIG. 2 spaced from an opposing seat face 64. The face 64 is coated with a suitable plastic material in the same fashion as the face 46 previously mentioned and as shown in FIG. 4. This enables it to function as a soft valve seat. The valving action is obtained by movement of the facing lip 61 and the captured O-ring 62 which perfects closure. The face 64 thus functions as a valve seat when the valve element moves against the seat. The flow path is therefore through the cylinder port 56, then through the passage 58 into the ring shaped cavity 57, past the open valve as shown in FIG. 2 and into the radial passages 55. Flow is introduced around the stem 36 and moves downwardly in the gap around the stem and on the inside of the spool 60. The flow is exhausted through an exhaust port 65 located at the bottom end of the stem 36. Several passages 65 are drilled to provide an adequate flow capacity. The exhaust port 65 delivers hydraulic fluid out of the valve.

When the coil 32 is de-energized, the valve stem 36 is forced downwardly by a coil spring 66. The spring 66 surrounds the stem and is concentric about the spool 60. The spring bears against a shoulder 67 on the interior of a threaded sleeve 68. The sleeve 68 is threaded on the exterior and captures an O-ring 69 which perfects a seal with the valve body 35. The sleeve 68 aids in assembly of the components. Moreover, it defines the internal cavity 57 on the interior of the sleeve. By means of suitable seal rings, the sleeve 68 prevents leakage through the bottom portions of the valve body. Further, the sleeve 68 captures and aligns the various spools around the stem 36.

These components are assembled by stacking the spools on the stem. It will be noted that it is possible for hydraulic fluid to flow along the stem 36. As it flows in the downwardly direction, it flows through the exhaust port 65 for return to the sump. Flow upwardly into the other components of the structure is limited by the various structural components including O-rings which prevent the fluid from entry into the area of the coil 32. Also, the hydraulic fluid does not leak out between the various components which are used in assembly of the structure.

There are two separate flow paths through the valve 25. When one is opened to deliver hydraulic fluid, the other is closed. When the valve is operated by the solenoid 32, one flow path previously open is then closed while the other flow path is reversed. The two flow paths use similar valve elements and valve seats. Each path is therefore properly controlled by the valve element comprising the overhanging lip capturing the O-ring opposite the coated metal face or seat. The Teflon coated seat is capable of securing a closed condition with minimum axial load. The teflon also prevents the adhesion of captured O-rings 45 and 62 to their respective seat faces 46 and 64 when the valve operates at elevated temperatures due to its anti-stick nature. As the solenoid pulls the stem upwardly or the spring pulls it downwardly, sealing action is obtained at the two valves. An important factor is to note the axial load required to perfect sealing; that is, the coil need not be strong and hence, the current required for operation can be reduced.

An important factor is to observe the loading boost obtained from valve operation. Consider the valve 25 shown in FIG. 2. The upper valve is closed, that is, snug against the face 46. When hydraulic fluid under pressure is introduced through the port 42, it bears against an enlarged surface area determined by the diameter of the lip 45. This large area creates a closing force. This force adds to the closing force from the spring 66. These cumulative forces load the valve element bearing against the valve seat 46. Recall that sealing is perfected at the O-ring 45. The seal obtained from the cooperative O-ring under spring loading is sufficient to maintain a bubble tight connection. That is, hydraulic loading of fluid admitted by the passage 42 assists in closure of the valve element against the face 46, thereby preventing fluid flow out through the discharge port 50. As shown in FIG. 2, when this flow path is closed by the valving action just described, the flow path through the cylinder port 56 and out through the exhaust port 65 is then open.

FIG. 3 shows the stem 36 moved upwardly. When this occurs, the uppermost valve is opened while the lower valve is closed. The valves achieve closure more readily on application of electric power to the solenoid coil because the Teflon coated valve seat surface seals more readily. So to speak, the coating is forgiving of surface irregularities, slight misalignment, capture of trash or particles against the coated surface, and other typical mechanisms interfering with valve operation.

The inlet port 42 is connected with a suitable supply line. The other ports are also connected with various supply or feed lines. They are in the surrounding structure adjacent to the valve 25 of this disclosure and are connected to it by suitable fittings. As desired, the various ports can be internally threaded and supply lines connected directly to the various ports. In operation, it should be recalled that the valve 25 may be exposed to elevated temperatures. When this occurs, there is no tendency to stick against the coated surface. That is, the valve element which bears against the coated facing valve seat seals when closed and yet opens without sticking or adhering to the movable valve element. The enlarged diameter of the valve element opposite the valve seat enhances the seal to extend the life of the valve element in conjunction with the coated valve seat. It is important to note that the effective (fluid loaded) area is thus larger than the seal area. While this is a relative matter depending on the ratio of sizes, the overhang which is shown on both valves enhances the sealing action.

In operation, a suitable electric signal is applied to the valve shown in FIGS. 2 and 3. The valve is thus operated between the positions of FIG. 2 and FIG. 3. When released, the spring 66 forces it back to the original position.

This valve structure in conjunction with the two hydraulic systems enables low power operation of the four way normally closed valve 25 in the sequential formation tester 10. It permits the hydraulic circuit 20 in the tool 10 to operate, thereby extending the life of the valve 25 and the sequential formation tester 10. While the foregoing is directed at preferred embodiment, the scope is determined by the claims which follow.

What is claimed is:

1. For use in a sequential formation tester operated by a tool hydraulic system having a hydraulic fluid source with fluid distributed through a valve, a valve comprising:
   (a) a valve body in a formation tester having a tool hydraulic system, the valve body having
      (1) a first inlet port, and
      (2) a first outlet port, said inlet and outlet ports being adapted to be connected in a formation tester tool hydraulic system;
   (b) an elongate stem in said body;
   (c) solenoid means for magnetically moving said stem;
   (d) circular valve seat means having
      (1) a metal member,
      (2) an exposed seat area on said member, and
      (3) resilient coating material on said seat area for a contact thereagainst;
   (e) movable valve element means having
      (1) a cooperative mating and matching circular valve element, and
      (2) an exposed area on said element for contact against said resilient coating material seat area of said valve seat means;

(f) seal means cooperatively positioned to seal between said valve seat means and said valve element means;

(g) means for positioning said valve element means and said circular valve seat means for relative opening and closing in response to operation of said solenoid means such that fluid flow is permitted and prevented by cooperation of said valve element means and said circular valve seat means;

(h) passage means cooperative with said first inlet port and said first outlet port through said valve body to deliver and remove fluid under control of said valve element means and said circular valve seat means as determined by said solenoid means;

(i) wherein said means for positioning includes a spool positioned about said stem, said spool movable with said stem, and said spool having a peripheral protruding flange with an edge located lip, said lip capturing said seal means thereunder wherein said lip and flange comprise said valve element means;

(j) wherein said flange and lip define an area larger than the open area between said circular valve seat means and said valve element means to thereby create a bias force acting to close said valve element means against said circular valve seat means;

(k) a cavity surrounding said valve element means upstream thereof for holding fluid bearing against said valve element means to create a closing force thereon;

(l) a second circular valve seat means substantially identical to said circular valve seat means;

(m) a cooperating second valve element means substantially identical to said valve element means;

(n) a second seal means substantially identical to said seal means;

(o) said stem positioning said second valve element means and said second circular valve seat means for relative opening and closing in response to operation of said solenoid means such that fluid flow is permitted and prevented by cooperation of said second valve element means and said second circular valve seat means;

(p) second passage means in said valve body cooperative with a second inlet and a second outlet to deliver fluid under control of said second valve element means and said second circular valve seat means as determined by said solenoid means;

(q) passage means adjacent to said stem communicating said second inlet and said second outlet and comprising a portion of said second passage means; and (r) wherein said means for positioning includes concentrically positioned spool means positioned about said stem means and defining therebetween said second passage means.

2. The apparatus of claim 1 wherein said solenoid means comprises a hollow cylindrical coil in said valve body, and said stem supports a cylindrical plug made of a material magnetically attracted by said coil, and further including means aligning said plug for movement toward of said coil, and further including retraction spring means for pulling said stem away from said coil.

3. The apparatus of claim 1 wherein said second passage means includes radial port passages through said spool means, thereby defining a portion of said second passage means.

4. The apparatus of claim 1 wherein said coating material is anti-sticking.

5. The apparatus of claim 1 wherein said resilient coating material is anti-sticking, and said second valve seat means includes a resilient, anti-sticking coating material thereon.

* * * * *